(12) United States Patent  
Prigent

(10) Patent No.: US 7,542,621 B2
(45) Date of Patent: Jun. 2, 2009

(54) METHOD OF DIGITAL SIMULATION OF IMAGE SUPPORT RENDERING

(75) Inventor: Thierry Prigent, Saint-Helene (FR)

(73) Assignee: Eastman Kodak Company, Rochester, NY (US)

( * ) Notice: Subject to any disclaimer, the term of this patent is extended or adjusted under 35 U.S.C. 154(b) by 725 days.

(21) Appl. No.: 10/565,861

(22) PCT Filed: Jul. 10, 2004

(86) PCT No.: PCT/EP2004/007622

§ 371 (c)(1),
(2), (4) Date: Jan. 24, 2006

(87) PCT Pub. No.: WO2005/015560

PCT Pub. Date: Feb. 17, 2005

(65) Prior Publication Data

US 2006/0229857 A1    Oct. 12, 2006

(30) Foreign Application Priority Data

Jul. 25, 2003    (FR) .................................. 03/09096

(51) Int. Cl.
*G06K 9/40* (2006.01)

(52) U.S. Cl. ...................... 382/274; 382/132
(58) Field of Classification Search ................ 382/274, 382/132; 355/67, 69; 348/577, 578, 96; 369/563; 375/240.01; 430/619, 503, 505, 430/214; 715/733

See application file for complete search history.

(56) References Cited

U.S. PATENT DOCUMENTS

| 5,140,414 | A | 8/1992 | Mowry ........................ 348/577 |
| 5,387,939 | A | 2/1995 | Collier .................. 375/240.01 |
| 5,406,326 | A | 4/1995 | Mowry ........................ 348/121 |
| 5,481,657 | A | 1/1996 | Schubert et al. ............. 345/418 |
| 6,201,890 | B1 | 3/2001 | Shi et al. ..................... 382/132 |
| 6,370,265 | B1 | 11/2002 | Bogdanowicz et al. ...... 382/132 |
| 2002/0163657 | A1 | 11/2002 | Bogdanowicz et al. ....... 358/1.9 |

FOREIGN PATENT DOCUMENTS

EP    1 318 671    6/2003

*Primary Examiner*—Anh Hong Do
(74) *Attorney, Agent, or Firm*—William R. Zimmerli

(57) ABSTRACT

A method of simulation of a recording support rendering called target rendering is provided. The method includes the following successive steps: a) the digitization of images (12) captured on a first support (10) and at least one sensitometry control (14) recorded on the same support, so as to obtain initial digital codes for a set of pixels taken in the images and the sensitometry control, b) the establishment, from the digital codes of the sensitometry control (26), of an initial sensitometry relationship (26) for the first digital support, the initial sensitometry relationship (26) linking the digital codes to the support's light exposure values, c) the establishment, from one target sensitometry relationship (28), corresponding to the target rendering, of new digital codes for a number of image pixels, the new digital codes being established so that the new digital code and initial digital code of each pixel are linked to the same exposure value, respectively by the target sensitometry relationship (28) and the initial sensitometry relationship (26).

9 Claims, 2 Drawing Sheets

METHOD OF DIGITAL SIMULATION OF IMAGE SUPPORT RENDERING

FIELD OF THE INVENTION

The present invention relates to a method of digital simulation of image support rendering. Image support rendering means the quality of expression of this support, i.e. the way that the support expresses the light and colors of a scene that has been photographed or filmed. The invention has applications in all fields of image capturing and processing, and in particular in the fields of cinematography and cinema.

BACKGROUND OF THE INVENTION

In order to make recordings, the first cameraman usually has available an entire range of films whose renderings are different. The films differ especially by their sensitivity and their color response. Certain films are more especially intended for capturing the images of scenes lit by artificial light. Others are intended for scenes lit by natural or daylight.

Devices such as the sensors of digital cameras can also be assimilated with image capturing supports. They also have a particular rendering, such that the images are different from those captured on silver film.

The artistic choices of a first cameraman, or the capture of various scenes in varied lighting conditions, require the availability of a large number of supports, with different renderings suited to each situation. Further, changes of filming supports, for instance changes of film in a recording camera, can become necessary during a shoot or during filming.

Yet another difficulty is the fact that the rendering of the same type of support can vary from one example to another. For instance, two films of the same type can have different renderings. If this difference stems relatively little from the film manufacturing processes, it can be accentuated by their aging or by chemical processing; such as development that films undergo.

The rendering variations between films of the same type or films of different type have the effect of producing a not very natural print or a print lacking uniformity when editing a cinematographic work. Rendering uniformity faults can also have the negative effects in fields other than the cinema, such as, for instance, medical or scientific photography fields.

U.S. Pat. Nos. 6,201,890; 5,406,326; 6,370,265 and 5,457,491 and U.S. Publication 2002/0163657 refer to techniques aiming to simulate the aesthetic appearance of images captured by film, to correct images, or to process them for projection purposes. However, the techniques described do not enable precise compensation for the rendering variations between different image supports.

SUMMARY OF TIE INVENTION

It is an object of the invention to propose a method to enable recordings to be made with a single type of support, or with a restricted number of types of support, while enabling image rendering in compliance with the user's artistic wishes to be obtained.

One object in particular is to propose such a method that enables shooting with a single type of film, nevertheless allowing a first cameraman to select a particular rendering from among a wide range of rendering made available.

It is another object of the invention to propose a method capable, if necessary, of obtaining uniform rendering and reducing the rendering variations that may exist between supports of the same type, which have been used or processed in conditions altering their nominal rendering.

To achieve these objects the purpose of the invention is more precisely a method of simulating a recording support rendering, called target rendering, from the rendering of the recording support actually used. The method comprises the following successive steps:

a) the digitization of images captured on a first support and at least one sensitometry control recorded on the same support, so as to obtain initial digital codes for a set of pixels taken in the images and sensitometry control, at least one code being linked to each pixel, b) the establishment of at least one initial sensitometry relationship for the first support, the initial sensitometry relationship established from the digital codes of the sensitometry control, linking the digital codes to the support's light exposure values, c) the establishment, from at least one target sensitometry relationship, corresponding to the target rendering, of new digital codes for a number of image pixels, the new digital codes being established so that the new digital code and the initial digital code of each pixel are linked to the same exposure value, respectively by the target sensitometry relationship and the initial sensitometry relationship.

A sensitometry control means any mark of the recording support representing its response to light exposure energy. In case of a silver film, it is exposure ranges, uniform or not, whose exposure energy is known, or whose exposure energy can be determined and whose optical density after development represents the film's response. The sensitometry control can be specific to certain color components.

Sensitometry controls enable sensitometry relationships to be established. These controls link a support's optical densities, or more precisely, the digital codes that represent the optical densities, to exposure values, i.e. light energies received by the support. In their graphic expression, the sensitometry relationships for a film are comparable to the sensitometry curves still called "S" curves. The invention is based on taking two sensitometry relationships into account. The initial sensitometry relationship enables exact characterization of the rendering of the recording support, for instance a film, on which images are captured. The target sensitometry relationship enables characterization of the support, or the film, whose quality of expression is to be simulated. In other words the target sensitometry relationship enables the required "rendering" to be fixed.

When the invention is implemented for black and white type images, or monochrome images, the digital codes can be converted by means of a single initial sensitometry relationship and a single target sensitometry relationship. In addition, these sensitometry relationships can be of a single dimension, i.e. correspond to a single color component.

For color images, several options of implementing the invention can be envisaged. A first option consists in using a number of sensitometry relationships with one dimension, corresponding respectively to various color components. For example, three sensitometry relationships corresponding respectively to the colors red, green and blue, or to the colors magenta, yellow and cyan, may suit.

The number of sensitometry relationships with one dimension means that color can be taken into account. However, they do not enable the "crosstalk" phenomenon capable of affecting image supports to be accounted for. "Crosstalk" means the crossing effect of color components one on another. This phenomenon is well known for silver films for which the sensitivity spectra of the various sensitivity layers partially match.

In order to take account of the mutual influences of the color components, it is possible, according to a development of the invention to take account of the initial and target sensitometry relationships expressed in a space with several color dimensions. This space can be formed for instance by three colors, such as the colors red, green, blue, or magenta, yellow, cyan. In this case, the digital code linked to each pixel is not a scalar value but a vector with components according to each of the colors that form the space. The same applies to the exposure energy. The sensitometry relationship thus links a vector expressing the exposure energy to a digital code vector.

The mutual influences of the color components can also be eliminated by calculation using correction matrices. Calculation means converting the digital code vectors into proper vectors that can be converted into new digital code vectors using sets of initial and target sensitometry relationships with one dimension. The sensitometry relationships with a dimension are then used respectively for the conversion of the vector components into new components of the new digital code vectors.

Another calculation can be performed from the new components so as to reconstitute a characteristic crosstalk of the target rendering. The order of the calculations can be modified by the choice of suitable correction matrices.

Using the invention method, it is possible to film or record with a support whose rendering is different than the required rendering, and then simulate the required rendering. For example, during a film shoot, a lack of lighting power can lead the first cameraman to select 5279-type film, despite his preference for 8274 type film. In this case, the invention method enables the recording to be made on 5279 type film and afterwards the images to be simulated as if they had been obtained using 5274 type film in optimal lighting conditions. Furthermore, when several supports, and in particular several films are used to shoot sequences in different locations, at different dates, and undergo different chemical processing, the method can be implemented to standardize the rendering of the various sequences. In the same way it can be implemented to correct the variations between films of the same type but coming from different batches. In this case, the actual sensitometry relationship of one of the films, or a standard sensitometry relationship, can be selected as target sensitometry relationship.

Finally, the method can be used to simulate the rendering of an electronic sensor, for instance a CCD sensor (charge-coupled device), from a silver film, or vice versa.

As simulation is mainly performed using digital codes, the method can be developed by using lookup tables (LUT). Thus, step c) of the above-mentioned method can comprise:
    the establishment of at least one conversion table between the initial digital codes and the new digital codes, the table being established in such a way that the new digital codes and the initial digital codes correspond to the same exposure energy, respectively of the target sensitometry relationship and the initial sensitometry relationship,
    the establishment of new codes for the image pixels by using the conversion table as a lookup table.

For a simulation concerning color images, a number of lookup tables can be established. A table with a single dimension in particular can be planned for each color component, red, green, blue, or magenta, yellow, cyan. Thus step c) of the method can comprise the establishment of a number of conversion tables between the initial digital codes and the new digital codes, the tables and the codes relating respectively to a number of color components. The lookup tables are established in such way that the new digital codes and the initial digital codes correspond respectively to the same exposure energy of a target sensitometry relationship and an initial sensitometry relationship, for the same color component.

According to a development that corresponds to the use of sensitometry relationships with three dimensions, as previously mentioned, a lookup table with three dimensions can be created. This appears, for instance, as a matrix with components according to the three colors selected to form the color space.

The lookup tables can be used for the conversion of the digital codes of all or part of the pixels of an image.

Also, the same lookup table can advantageously be used for the conversion of the digital codes of an image set, for instance, all the images of the same sequence of a film, or all the images of the same film.

It should be said that the lookup tables are normally only used for the image support or image support part whose sensitometry control was used to establish the initial sensitometry relationship.

Other characteristics and advantages of the invention will appear in the following description, with reference to the figures in the appended drawings. This description is given purely as an illustration and is not limiting.

The invention also relates to a recording method comprising:
    the capture of images on an image support having a first rendering,
    the capture of at least one sensitometry control on the same image support,
    the retrieval of digital data from the image support and the simulation of a support rendering different than the first rendering, the simulation taking place according to a method as described above.

DETAILED DESCRIPTION OF MODES OF DIPLEMENTING THE INVENTION

Figure 1:
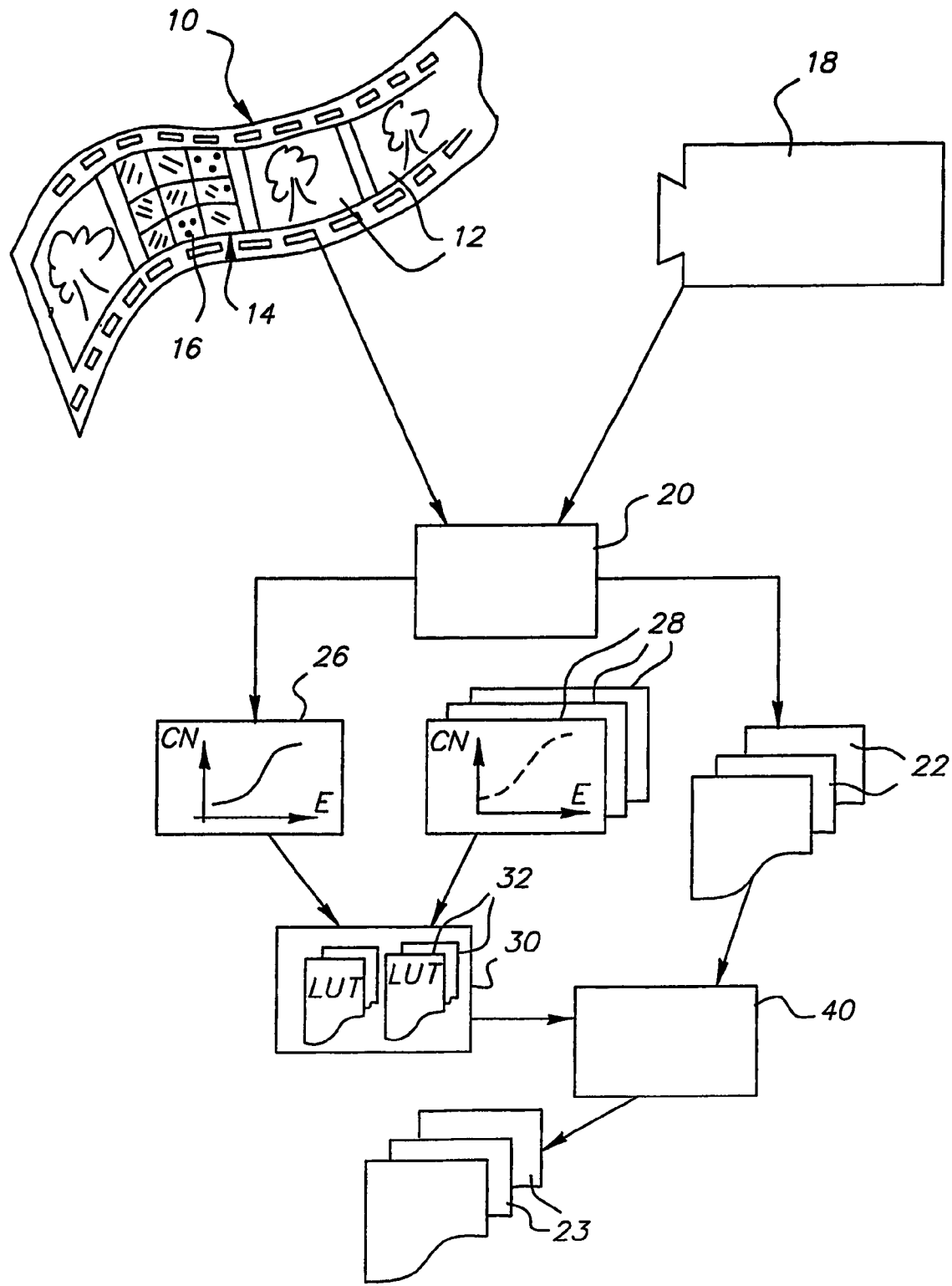
FIG. 1 is a flowchart representing the possible implementation steps of a method according to the invention.

Ref. 10 of FIG. 1 shows part of a silver film. It is the main type of image support that the invention addresses. The film 10 comprises images 12 of a shooting sequence and a sensitometry control 14.

The purpose of the sensitometry control 14 is to account for the film's characteristics. Therefore it has several exposure ranges 16.

Each range 16 is exposed to a set amount of light energy. Following development, therefore, it has an optical density that presents the film's response to this light energy.

Sensitometry controls can be formed according to various techniques and for different color components. The ranges 16 can be uniform or not. For instance, they can be ranges having an exposure gradient. Similarly, the exposure energy for each range can be known precisely, or relate to a progression so that it can be found by calculation. As the forming of sensitometry controls is known, it will not be described further here. Cameras may comprise an integral exposure device that enables sensitometry controls to be formed in various parts of the film. Preferably, the control is formed on a reserved part of the film where no other image is captured. For instance, it can be formed at the start of the film in a sequence, when the camera is started or stopped, or even between the images. A sensitometry control can also be formed before each shooting sequence. The superimposition of the sensitometry control and image nevertheless remains possible.

When sensitometry controls are formed in a way more or less concomitant with images, they have the advantage of experiencing the same aging as the images. The film parts bearing the sensitometry controls are also subject to the same thermal stresses and the same chemical processing as the neighboring parts of film which bear the images.

A block 20 of FIG. 1 represents the digitizing of the images and sensitometry controls. This operation is performed using a scanner, such as, for instance, a digital conversion telecine. A previously calibrated scanner is preferably used. It enables digital codes to be linked to a number of image pixels and sensitometry controls. The digital codes are linked to the film's digital density. Digitizing enables two types of digital code to be established respectively. The first code type comprises image data. These data can be organized as files 22. One file corresponds, for instance, to each image of the film. The second code type comprises sensitometry data that correspond to codes established from the sensitometry control. The sensitometry data enable a sensitometry relationship 26 to be established. This is summarily shown as a sensitometry curve. Exposure data can be distinguished according to the film's color components. For instance this is red, green, blue, or magenta, cyan, yellow. Thus a sensitometry relationship specific to each color component or a sensitometry relationship with three dimensions can be established.

The image support can be something other than a film. Reference 18 designates a digital camera in which the image support is a charge-coupled device sensor (CCD) or a sensor with complementary metal oxide semiconductor elements (CMOS). The sensor delivers a signal that is converted into digital data using a digital analog converter. This conversion, performed in the camera is then equivalent to the digitizing step shown by reference 20. In this case, the sensitometry control can amount to the sending of a number of reference electrical signals obtained by exposing the sensor using a reference exposure device or using a color chart or a gray chart. In the description that follows reference will be made more precisely to film, but it should be kept in mind that the image or sensitometry control digital data can come from a digital camera.

Whatever the source of the data, an initial sensitometry relationship 26 is established. As mentioned above, the initial sensitometry relationship accurately expresses the behavior of the support or film from which the images come.

Implementation of the method also makes use of a number of sensitometry relationships 28 called "target". This may be the sensitometry relationships of an existing film, but mainly ideal or standard sensitometry relationships, expressing various cinematographic renderings.

The initial sensitometry relationships and target sensitometry relationships are used to form the lookup tables 32 (LUT) at the time of the step shown by reference 30 in FIG. 1. The lookup tables 32 respectively link new digital codes to a number of initial digital codes. Generally, a lookup table links a new code to each possible initial code, given the resolution. For instance, for a 10-bit resolution the lookup table has a new code linked to each of the codes between 0 and 1023.

Figure 2:
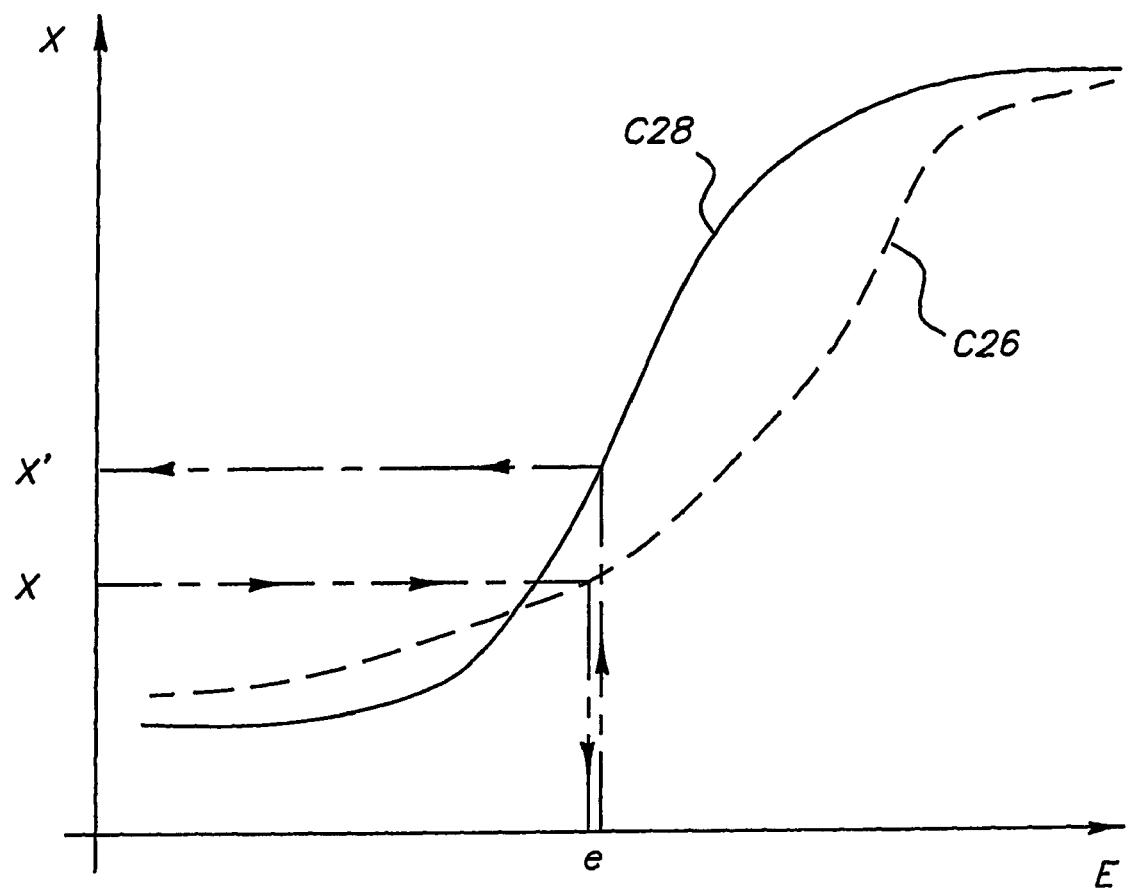
FIG. 2 represents two characteristic sensitometry curves respectively of an initial sensitometry relationship and a target sensitometry relationship, used during the execution of the method of FIG. 1.

The use of the sensitometry relationships to establish lookup tables is illustrated by FIG. 2.

FIG. 2 represents in graphic form two sensitometry curves C26 and C28 corresponding respectively to an initial sensitometry relationship and a target sensitometry relationship 28. However, sensitometry relationships are not necessarily expressed as curves. For instance, they may be tables respectively linking digital codes to exposure values.

The graph of FIG. 2 shows the exposure energy values along the abscissa, and with logarithmic scale, and the digital codes along the ordinate. The graph shows respectively a curve C26 representative of an initial sensitometry relationship and a curve C28 representative of a target sensitometry relationship. The two curves are shown to the same scale in the same coordinate system.

Curve C26 is constant based on digital codes coming from a sensitometry control of the film, like the control 14 of FIG. 1. One code is for instance linked to each range 16.

For reasons of simplification of the above, the graph of FIG. 2 shows the sensitometry relationships with a single dimension corresponding to a monochrome support or to one particular color component. However, the principle of establishing new digital codes remains the same for sensitometry relationships with two or three dimensions. The codes are then considered as vectors.

The establishment of a new digital code from an initial digital code is described below. This operation can take place for each digital code of each pixel. It can also take place in a unique way for all the possible digitizing codes, to establish a lookup table. As shown above for 10-bit digitizing, the lookup table links a new code x to each initial code x taken between 0 and 1023, which is identical to or different than x, also taken between 0 and 1023.

In FIG. 2 any code x is taken as an example. This is an initial code. The first sensitometry relationship, shown by the curve C26 for a given support, enables the exposure energy to be determined for which the digital code x corresponds. This exposure energy is noted e. Then, we search for which digital code x' is linked to this same energy e by the target sensitometry relationship shown by curve C28. In FIG. 2 the arrows pointing to the value e and coming from the value e are slightly offset simply for clarity purposes.

In a lookup table constructed in the above way, the new digital code x' is linked to the initial code x. Such tables 32 are established during the table construction step 30, shown in FIG. 1. Several tables corresponding to several color components can be established for the same final rendering. Similarly, several tables for a simulation of several different renderings can be established from the same initial sensitometry relationship.

Returning to FIG. 1, a block 40 of FIG. 1 shows the processing of the image files 22 coming from the digitizing. These files' digital codes are converted using the lookup tables corresponding to the rendering selected by the user, to obtain the files 23. For each pixel these contain a new code, or several new digital codes corresponding respectively to the various color components. The conversion takes place by replacing each digital code of the initial files 22 by a new code shown by a lookup table.

A lookup table 32, established from the sensitometry relationships 26 and 28, can also be used to simulate the rendering of a film or image support, whose sensitometry curve is the curve C28, from a film or image support, whose sensitometry curve is the curve C26.

The sensitometry relationship 28 or the curve C28 can express the theoretical values of a given film type. They can also be those of an actual film, and be established from a sensitometry control.

The invention claimed is:

1. A method of simulation of a recording support rendering called target rendering, comprising the following successive steps:

a) the digitization of images captured on a first support and at least one sensitometry control recorded on the same support, so as to obtain initial digital codes (x) for a set of pixels taken in the images and sensitometry control, b) the establishment, from the digital codes of the sensitometry control, of at least one initial sensitometry relationship for the first support, the initial sensitometry relationship linking the digital codes to the support's light exposure values, c) the establishment, from at least one target sensitometry relationship, corresponding to the target rendering, of new digital codes (x') for a plurality of image pixels, the new digital codes being established so that the new digital code (x') and the initial digital code (x) of each pixel are linked to the same exposure value (e), respectively by the target sensitometry relationship and the initial sensitometry relationship.

2. A method according to claim 1, wherein step c) comprises:

the establishment of at least one conversion table between the initial digital codes and the new digital codes, the table being established in such a way that the new digital codes and the initial digital codes correspond to the same exposure energy respectively of the target sensitometry relationship and the initial sensitometry relationship, the establishment of new codes for the image pixels by using the conversion table as a look-up table.

3. A method according to claim 1, comprising the establishment of a number of initial sensitometry relationships for a number of captured image color components, and the establishment of new digital codes using respectively the number of initial sensitometry relationships and a number of corresponding target sensitometry relationships.

4. A method according to claim 3, wherein three initial and target sensitometry relationships are used respectively for three color components.

5. A method according to claim 3, wherein the step c) comprises:

the establishment of a plurality of conversion tables between the initial digital codes and the new digital codes, the tables and codes referring respectively to a plurality of color components, the tables being established so that the new digital codes and the initial digital codes correspond respectively to the same exposure energy of the target sensitometry relationship and the initial sensitometry relationship for the same color component, and the establishment of new codes for the image pixels by using the conversion tables as lookup tables.

6. A method according to claim 1, comprising the establishment of an initial sensitometry relationship expressed in a three dimensional color space, and the establishment of vectorial digital codes, expressed in the same space, using the initial sensitometry relationship and a target sensitometry relationship, also with three dimensions.

7. A method according to claim 6 comprising the establishment of at least one matrix conversion table in three dimensions between the initial digital codes and the new digital codes, expressed in a three dimensional color space, the table being established so that the new digital codes and initial digital codes correspond to the same exposure energy respectively of the target sensitometry relationship and the initial sensitometry relationship, and the establishment of the new digital codes for image pixels by using the conversion table as a lookup table.

8. A recording method comprising:

the forming of images on an image support having a first rendering, the forming of at least one sensitometry control on the same image support, the retrieval of digital data from the image support and the simulation of a support rendering different than the first rendering, the simulation taking place according to a method compliant with claim 1.

9. A method according to claim 8, wherein the forming of the sensitometry control and the image capture are more or less concomitant.

* * * * *

UNITED STATES PATENT AND TRADEMARK OFFICE
CERTIFICATE OF CORRECTION

| | |
|---|---|
| PATENT NO. | : 7,542,621 B2 |
| APPLICATION NO. | : 10/565861 |
| DATED | : June 2, 2009 |
| INVENTOR(S) | : Thierry Prigent |

It is certified that error appears in the above-identified patent and that said Letters Patent is hereby corrected as shown below:

First Page, Col. 2 (56) References Cited, U.S. Patent Documents    Between "5,406,326 A 4/1995 Mowry 348/121 and 5,481,657 A 1/1996 Schubert et al. 345/418" add --5,457,491 4/2002 Bell et al. 348/104--, therefor.

Delete "2002/0163657 A1 11/2002 Bogdanowicz et al. 358/1.9" and add --2002/0163657 A1 10/1995 Mowry 358/1.9--, therefor.

Signed and Sealed this

Tenth Day of November, 2009

David J. Kappos
*Director of the United States Patent and Trademark Office*